US012786584B2

(12) United States Patent
Huang et al.

(10) Patent No.: US 12,786,584 B2
(45) Date of Patent: Nov. 3, 2026

(54) GATE DRIVING CIRCUIT

(71) Applicant: E Ink Holdings Inc., Hsinchu (TW)

(72) Inventors: Pei-Lin Huang, Hsinchu (TW); Chia-Hsien Wu, Hsinchu (TW); Jia-Hung Chen, Hsinchu (TW); An-Chi Liu, Hsinchu (TW); Pei Ju Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/079,481

(22) Filed: Mar. 14, 2025

(65) Prior Publication Data

US 2025/0358540 A1 Nov. 20, 2025

Related U.S. Application Data

(60) Provisional application No. 63/648,677, filed on May 17, 2024.

(51) Int. Cl.
*H04N 25/673* (2023.01)

(52) U.S. Cl.
CPC ... *H04N 25/673* (2023.01); *G09G 2310/0267* (2013.01); *G09G 2330/021* (2013.01)

(58) Field of Classification Search
CPC ....... G09G 2310/0286; G09G 2310/08; G09G 2310/0267; G09G 2310/0251; G09G 2310/067; G09G 2310/06; G09G 2310/0224; G09G 2310/0291; G09G 2310/0281; G09G 2310/0264; G09G 2310/0283; G09G 2310/0289; G09G 2310/061; G09G 3/3677; G09G 3/20;
(Continued)

(56) References Cited

U.S. PATENT DOCUMENTS

| | | | |
|---|---|---|---|
| 8,264,443 | B2 | 9/2012 | Lee et al. |
| 10,923,208 | B2 | 2/2021 | Feng et al. |
| 11,081,058 | B2 | 8/2021 | Feng et al. |
| 11,081,199 | B2 | 8/2021 | Feng |

(Continued)

FOREIGN PATENT DOCUMENTS

| | | | |
|---|---|---|---|
| TW | I811018 | B | 8/2023 |
| TW | I811019 | B | 8/2023 |
| WO | 2017118113 | A1 | 7/2017 |

OTHER PUBLICATIONS

"Office Action of Taiwan counterpart Application", issued on Jan. 14, 2026, p. 1-p. 3.

*Primary Examiner* — Dong Hui Liang
(74) *Attorney, Agent, or Firm* — JCIPRNET

(57) ABSTRACT

A gate driving circuit is provided. The gate driving circuit includes a pull-up circuit, a pull-down circuit, an output transistor, a control transistor, and a noise suppression circuit. The pull-up circuit pulls up a voltage value at an operating node according to an (n−1)th control signal. The pull-down circuit pulls down the voltage value at the operating node according to an (n+1)th control signal. The output transistor outputs a gate driving signal according to a first clock signal and the voltage value at the operating node. The control transistor outputs an n-th control signal according to the first clock signal and the voltage value at the operating node. The noise suppression circuit suppresses noise at the operating node, noise at a second terminal of the output transistor, and noise at a second terminal of the control transistor according to the (n+1)th control signal.

16 Claims, 7 Drawing Sheets

GD(n)

(58) Field of Classification Search
CPC ...... G09G 3/3266; G09G 3/36; G09G 3/3696; G09G 3/30; G09G 3/3233; G09G 3/3208; G09G 3/2092; G09G 3/3611; G09G 3/3648; G09G 3/3674; G09G 2300/0408; G09G 2300/0426; G09G 2300/0842; G09G 2300/0465; G09G 2300/0417; G09G 2300/08; G09G 2300/0809; G09G 2320/0295; G09G 2320/0247; G09G 2320/0219; G09G 2320/0214; G09G 2320/0209; G09G 2320/02; G09G 2320/0223; G09G 2320/0257; G09G 2320/043; G09G 2330/06; G09G 2330/023; G09G 2330/08; G09G 2330/021; G09G 5/003
See application file for complete search history.

(56) References Cited

U.S. PATENT DOCUMENTS

| | | | | |
|---|---|---|---|---|
| 2017/0221441 | A1* | 8/2017 | Gu | G06F 3/04184 |
| 2017/0270892 | A1* | 9/2017 | Wang | G11C 19/28 |
| 2019/0180834 | A1 | 6/2019 | Yuan et al. | |
| 2020/0020266 | A1 | 1/2020 | Feng et al. | |
| 2020/0243034 | A1* | 7/2020 | Gu | G09G 3/3677 |
| 2020/0258464 | A1 | 8/2020 | Wang | |
| 2022/0180797 | A1 | 6/2022 | Xu et al. | |
| 2022/0199034 | A1 | 6/2022 | Yun et al. | |
| 2022/0335870 | A1* | 10/2022 | Gu | G09G 3/20 |
| 2022/0335878 | A1 | 10/2022 | Song et al. | |
| 2022/0375412 | A1 | 11/2022 | Kim et al. | |
| 2023/0351970 | A1 | 11/2023 | Lu et al. | |

* cited by examiner

GATE DRIVING CIRCUIT

CROSS-REFERENCE TO RELATED APPLICATION

This application claims the priority benefit of U.S. provisional application Ser. No. 63/648,677, filed on May 17, 2024. The entirety of the above-mentioned patent application is hereby incorporated by reference herein and made a part of this specification.

BACKGROUND

Technical Field

The disclosure relates to an electronic circuit, and in particular to a gate driving circuit.

Description of Related Art

An electronic device (for example, an image sensing device or a display) includes a gate driving device. The gate driving device includes multiple gate driving circuits. The gate driving circuits may provide gate driving signals. Therefore, pixel rows of the display may be scanned according to the gate driving signals. However, the gate driving signals may be interfered by temperature, a pixel circuit, or other circuits and generate noise. When the n-th gate driving signal of the n-th gate driving circuit generates noise, there may be abnormality in other gate driving circuits operating based on the n-th gate driving signal. It should be noted that the noise of the n-th gate driving signal may cause other gate driving circuits to be short circuited and damaged. Therefore, how to improve the stability of the gate driving circuit is one of the research focuses of persons skilled in the art.

SUMMARY

The disclosure provides a gate driving circuit with high stability.

In an embodiment of the disclosure, the gate driving circuit includes a pull-up circuit, a pull-down circuit, an output transistor, a coupling capacitor, a control transistor, and a noise suppression circuit. The pull-up circuit is connected to an operating node. The pull-up circuit pulls up a voltage value at the operating node according to an (n−1)th control signal. The pull-down circuit is connected to the operating node. The pull-down circuit pulls down the voltage value at the operating node according to an (n+1)th control signal. A first terminal of the output transistor receives a first clock signal. A second terminal of the output transistor outputs a gate driving signal. A control terminal of the output transistor is connected to the operating node. The coupling capacitor is connected between the second terminal of the output transistor and the control terminal of the output transistor. A first terminal of the control transistor receives the first clock signal. A second terminal of the control transistor outputs an n-th control signal. A control terminal of the control transistor is connected to the operating node. The noise suppression circuit is connected to the operating node, the second terminal of the output transistor, and the second terminal of the control transistor. The noise suppression circuit suppresses noise at the operating node, noise at the second terminal of the output transistor, and noise at the second terminal of the control transistor according to the (n+1)th control signal.

Based on the above, the control transistor outputs the n-th control signal. Therefore, the gate driving circuit may use the n-th control signal to control other gate driving circuits. The n-th control signal is not interfered by a pixel circuit. In addition, the noise suppression circuit suppresses the noise at the operating node, the noise at the second terminal of the output transistor, and the noise at the second terminal of the control transistor. The noise suppression circuit isolates the interference at the operating node, the second terminal of the output transistor, and the second terminal of the control transistor. Therefore, the risk of abnormality in the n-th control signal and the gate driving signal may be reduced. In this way, the gate driving circuit has high stability.

DESCRIPTION OF THE EMBODIMENTS

Figure 1:
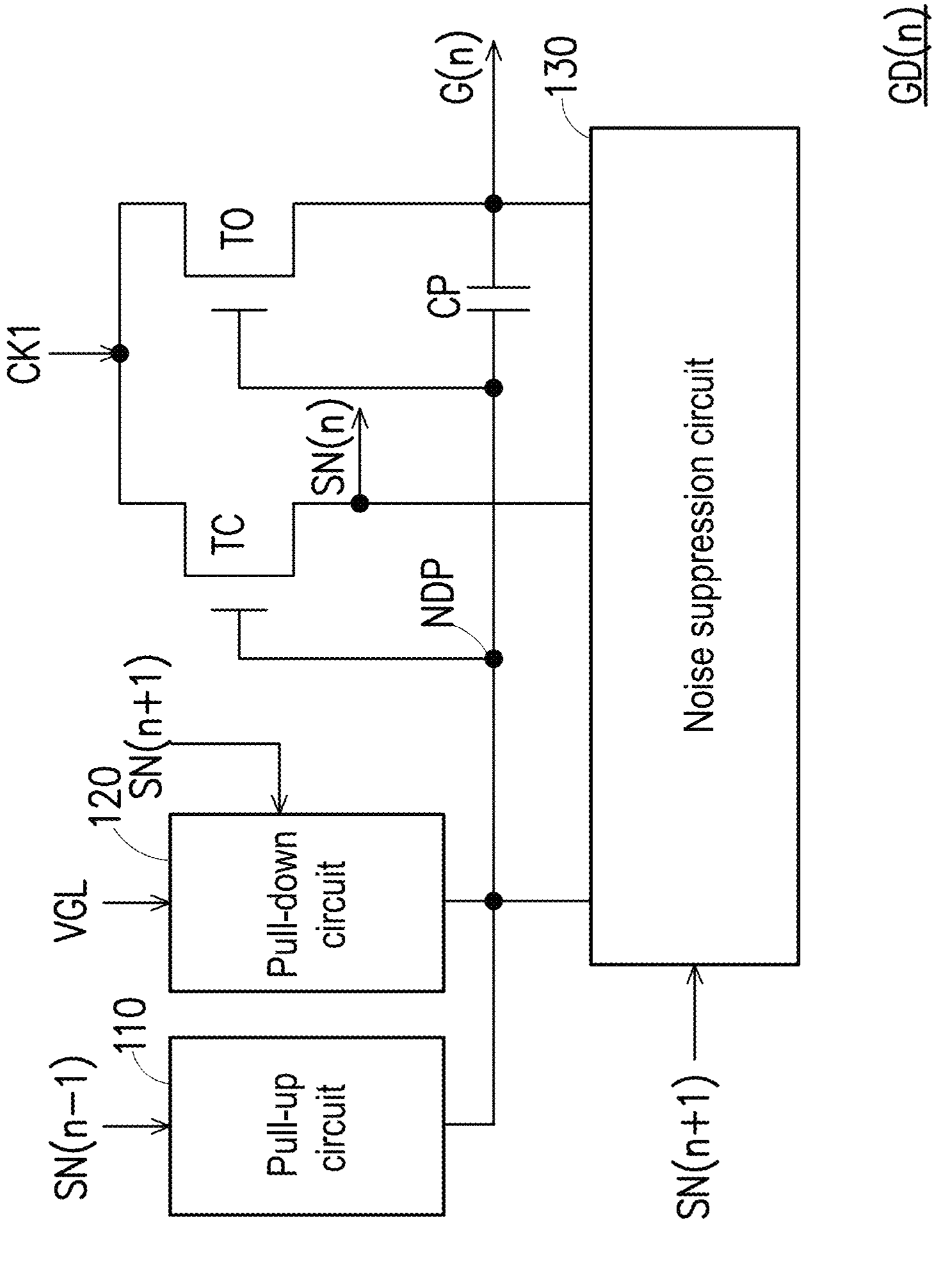
FIG. 1 is a schematic diagram of a gate driving circuit according to an embodiment of the disclosure.

Some embodiments of the disclosure will be described in detail with reference to the drawings. For the reference numerals cited in the following description, when the same reference numerals appear in different drawings, the reference numerals will be regarded as referring to the same or similar elements. The embodiments are only a part of the disclosure and do not disclose all possible implementations of the disclosure. More specifically, the embodiments are merely examples in the claims of the disclosure.

Please refer to FIG. 1. FIG. 1 is a schematic diagram of a gate driving circuit according to an embodiment of the disclosure. In the embodiment, a gate driving circuit GD(n) may be an n-th gate driving unit in a gate driving device. The gate driving circuit GD(n) includes a pull-up circuit 110, a pull-up circuit 120, an output transistor TO, a coupling capacitor CP, a control transistor TC, and a noise suppression circuit 130. The pull-up circuit 110 is connected to an operating node NDP. The pull-up circuit 110 pulls up a voltage value at the operating node NDP according to an (n−1)th control signal SN(n−1). The pull-down circuit 120 is connected to the operating node NDP. The pull-down circuit 120 pulls down the voltage value at the operating node NDP according to an (n+1)th control signal SN(n+1).

In the embodiment, a first terminal of the output transistor TO receives a first clock signal CK1. A second terminal of the output transistor TO outputs a gate driving signal G(n). A control terminal of the output transistor TO is connected to the operating node NDP. The coupling capacitor CP is connected between the second terminal of the output transistor TO and the control terminal of the output transistor TO. A first terminal of the control transistor TC receives the first clock signal CK1. A second terminal of the control transistor TC outputs an n-th control signal SN(n). A control terminal of the control transistor TC is connected to the operating node NDP.

In the embodiment, the gate driving circuit GD(n) uses the gate driving signal G(n) to drive a pixel circuit (not shown). The gate driving circuit GD(n) uses the n-th control signal SN(n) to control other gate driving circuits.

In the embodiment, the output transistor TO and the control transistor TC are respectively implemented by N-type transistors. The output transistor TO and the control transistor TC may respectively be N-type thin film transistors (TFTs), but the disclosure is not limited thereto. Therefore, the output transistor TO outputs the gate driving signal G(n) according to the first clock signal CK1 and a high voltage value at the operating node NDP. The control transistor TC outputs the n-th control signal SN(n) according to the first clock signal CK1 and the high voltage value at the operating node NDP. Therefore, the n-th control signal SN(n) may be a replica signal of the gate driving signal G(n).

In the embodiment, the noise suppression circuit 130 is connected to the operating node NDP, the second terminal of the output transistor TO, and the second terminal of the control transistor TC. The noise suppression circuit 130 suppresses noise at the operating node NDP, noise at the second terminal of the output transistor TO, and noise at the second terminal of the control transistor TC according to the (n+1)th control signal SN(n+1).

It is worth mentioning here that the gate driving circuit may use the n-th control signal SN(n) to control other gate driving circuits. The n-th control signal SN(n) is not interfered by the pixel circuit. In addition, the noise suppression circuit 130 suppresses the noise at the operating node NDP, the noise at the second terminal of the output transistor TO, and the noise at the second terminal of the control transistor TC. The noise suppression circuit 130 isolates interference at the operating node NDP, the second terminal of the output transistor TO, and the second terminal of the control transistor TC. Therefore, the risk of abnormality in the n-th control signal SN(n) and the gate driving signal G(n) may be reduced. In this way, the gate driving circuit GD(n) has high stability. In addition, in the case where the n-th control signal SN(n) does not generate noise, the risk of short circuit caused by abnormality in other gate driving circuits may be reduced. Therefore, the life of the gate driving device may be increased.

In the embodiment, the (n−1)th control signal SN(n−1) and the (n+1)th control signal SN(n+1) may be provided by other gate driving circuits. For example, the (n−1)th control signal SN(n−1) may be provided by a gate driving circuit GD(n−1) (not shown). The (n+1)th control signal SN(n+1) may be provided by a gate driving circuit GD(n+1) (not shown). In the embodiment, n may be any positive integer. When n equals "1", the (n−1)th control signal SN(n−1) may be an initial signal.

In the embodiment, the pull-up circuit 110 pulls up the voltage value at the operating node NDP in response to a voltage value of a pulse wave of the (n−1)th control signal SN(n−1).

In the embodiment, the pull-down circuit 120 pulls down the voltage value at the operating node NDP using a reference low voltage VGL in response to a pulse wave of the (n+1)th control signal SN(n+1).

Figure 2:
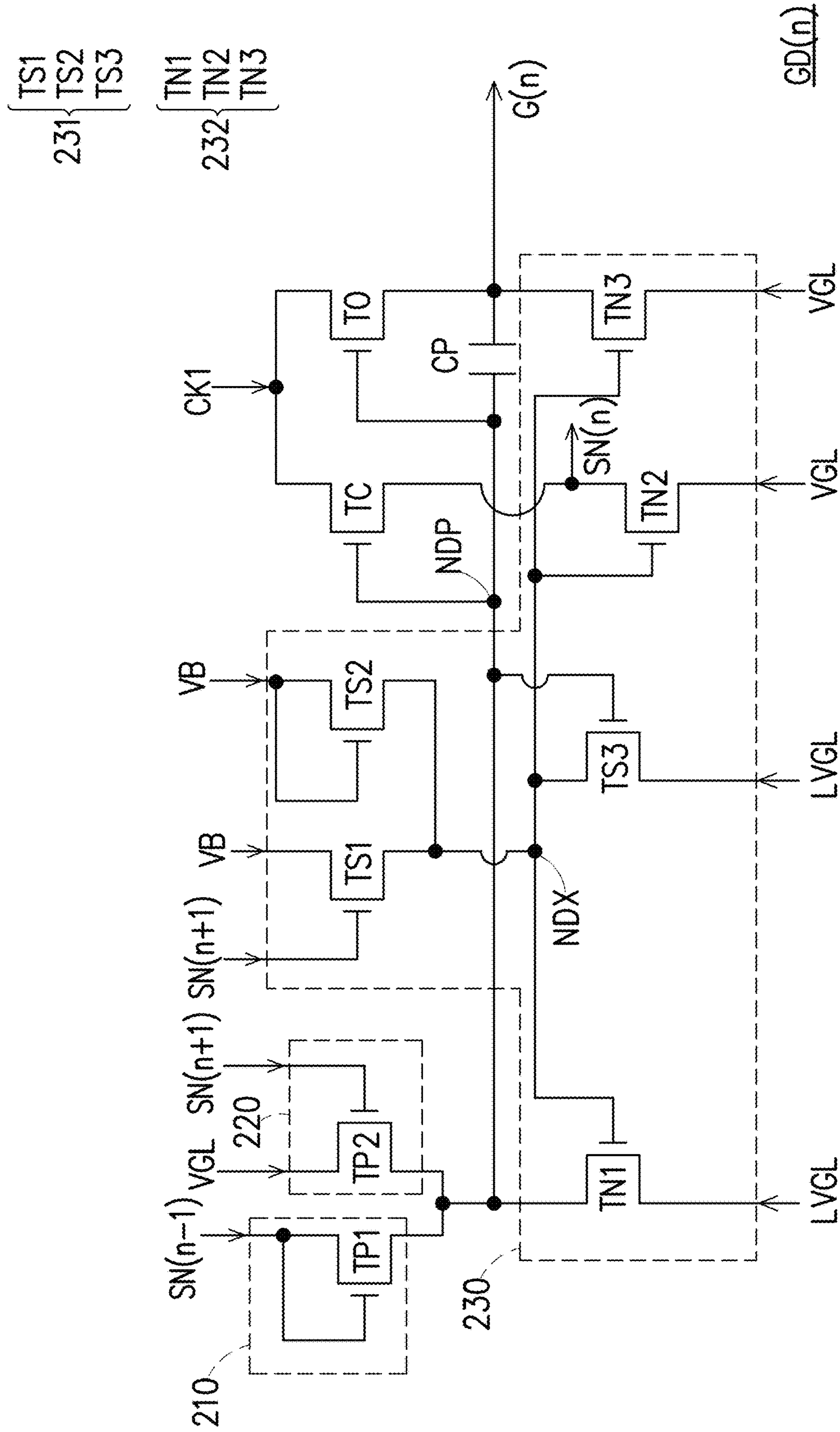
FIG. 2 is a schematic diagram of a gate driving circuit according to an embodiment of the disclosure.

Please refer to FIG. 2. FIG. 2 is a schematic diagram of a gate driving circuit according to an embodiment of the disclosure. In the embodiment, the gate driving circuit GD(n) includes a pull-up circuit 210, a pull-down circuit 220, the output transistor TO, the coupling capacitor CP, the control transistor TC, and a noise suppression circuit 230. Connection manners of the output transistor TO, the coupling capacitor CP, and the control transistor TC have been clearly explained in the embodiment of FIG. 1 and will not be repeated here.

The pull-up circuit 210 includes a pull-up transistor TP1. A first terminal of the pull-up transistor TP1 and a control terminal of the pull-up transistor TP1 receive the (n−1)th control signal SN(n−1). A second terminal of the pull-up transistor TP1 is connected to the operating node NDP. In the embodiment, the pull-up transistor TP1 is implemented by an N-type transistor. The pull-up transistor TP1 may be an N-type TFT (but the disclosure is not limited thereto). The pull-up transistor TP1 is connected between the (n−1)th control signal SN(n−1) and the operating node NDP in a diode connection manner. Therefore, the pull-up transistor TP1 may be conducted according to a positive pulse wave of the (n−1)th control signal SN(n−1), and pulls up the voltage value at the operating node NDP to a first voltage value using the positive pulse wave of the (n−1)th control signal SN(n−1). Therefore, the control transistor TC and the output transistor TO are conducted. In addition, the pull-up transistor TP1 may float the operating node NDP according to a low voltage value (for example, equal to or below 0 volts).

The pull-down circuit 220 includes a pull-down transistor TP2. A first terminal of the pull-down transistor TP2 receives the reference low voltage VGL. A second terminal of the pull-down transistor TP2 is connected to the operating node NDP. A control terminal of the pull-down transistor TP2 receives the (n+1)th control signal SN(n+1). The pull-down transistor TP2 is implemented by an N-type transistor. The pull-down transistor TP2 may be an N-type TFT (but the disclosure is not limited thereto). Therefore, the pull-down transistor TP2 is conducted using a positive pulse wave of the (n+1)th control signal SN(n+1), and pulls down the voltage value at the operating node NDP using the reference low voltage VGL. Therefore, the control transistor TC and the output transistor TO are disconnected.

In the embodiment, the noise suppression circuit 230 includes a setting circuit 231 and a voltage stabilizing circuit 232. The setting circuit 231 is connected to a control node NDX. The setting circuit 231 pulls up a voltage value at the control node NDX to a high voltage value according to the (n+1)th control signal SN(n+1). The voltage stabilizing circuit 232 is connected to the control node NDX, the operating node NDP, the second terminal of the output transistor TO, and the second terminal of the control transistor TC. The voltage stabilizing circuit 232 suppresses the noise at the operating node NDP, the noise at the second terminal of the output transistor TO, and the noise at the second terminal of the control transistor TC in response to the high voltage value at the control node NDX. Furthermore, the voltage stabilizing circuit 232 stabilizes a low voltage value at the operating node NDP, a low voltage value at the second terminal of the output transistor TO, and a low voltage value at the second terminal of the control transistor TC. Therefore, the noise at the operating node NDP, the noise at the second terminal of the output transistor TO, and the noise at the second terminal of the control transistor TC may be suppressed.

In the embodiment, the setting circuit 231 includes setting transistors TS1 to TS3. A first terminal of the setting transistor TS1 receives a bias signal. A second terminal of the setting transistor TS1 is connected to the control node NDX. A control terminal of the setting transistor TS1 receives the (n+1)th control signal SN(n+1). A first terminal of the setting transistor TS2 receives a bias signal VB. A second terminal of the setting transistor TS2 is connected to the control node NDX. A control terminal of the setting transistor TS2 receives the bias signal VB. In some embodiments, the control terminal of the setting transistor TS2 may receive a second clock signal different from the first clock signal CK1. In the embodiment, the first terminal of the setting transistor TS3 is connected to the control node NDX. A second terminal of the setting transistor TS3 is connected to a reference low voltage LVGL. A control terminal of the setting transistor TS3 is connected to the operating node NDP.

In the embodiment, the voltage stabilizing circuit 232 includes transistors TN1 to TN3. A first terminal of the transistor TN1 is connected to the operating node NDP. A second terminal of the transistor TN1 is connected to the reference low voltage LVGL. A control terminal of the transistor TN1 is connected to the control node NDX. A first terminal of the transistor TN2 is connected to the second terminal of the control transistor TC. A second terminal of the transistor TN2 is connected to the reference low voltage VGL. A control terminal of the transistor TN2 is connected to the control node NDX. A first terminal of the transistor TN3 is connected to the second terminal of the output transistor TO. A second terminal of the transistor TN3 is connected to the reference low voltage VGL. A control terminal of the transistor TN3 is connected to the control node NDX.

In the embodiment, the setting transistors TS1 to TS3 and the transistors TN1 to TN3 are respectively implemented by N-type transistors. The setting transistors TS1 to TS3 and the transistors TN1 to TN3 may respectively be N-type TFTs (but the disclosure is not limited thereto). Control terminals of the transistors TN1 to TN3 are connected to the control node NDX. Therefore, the transistors TN1 to TN3 are conducted according to the high voltage value at the control node NDX and are disconnected according to a low voltage value at the control node NDX.

In the embodiment, the voltage value of the reference low voltage VGL is the same as or different from the voltage value of the reference low voltage LVGL.

Figure 3:
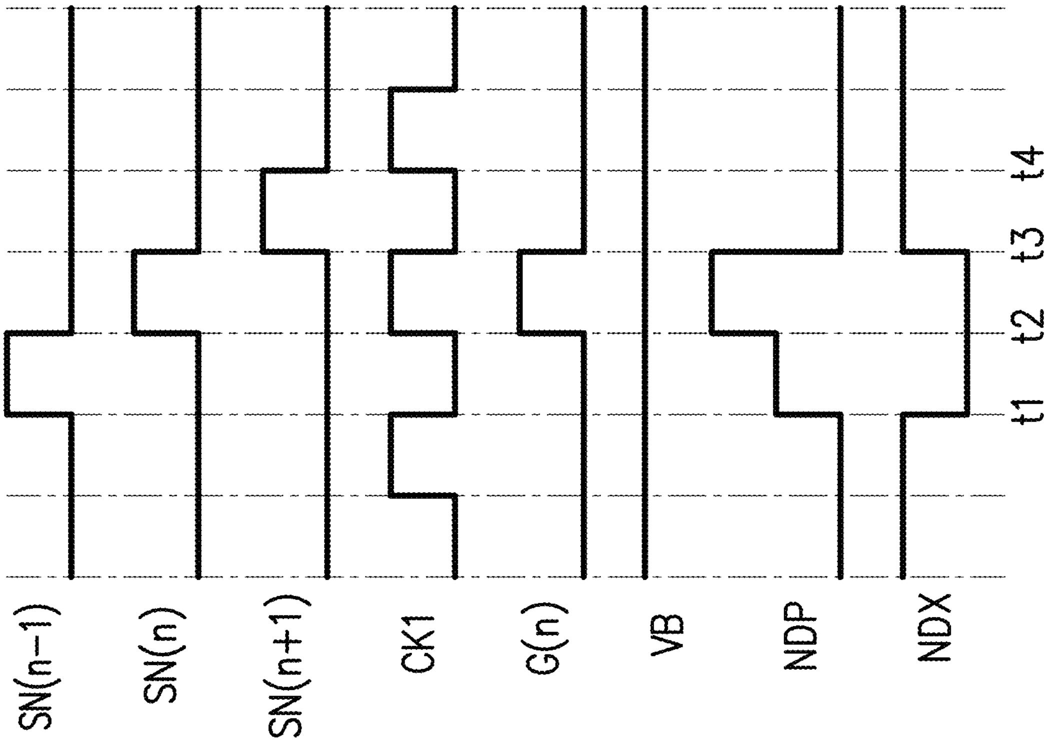
FIG. 3 is a signal timing diagram according to an embodiment of the disclosure.

Please refer to FIG. 2 and FIG. 3. FIG. 3 is a signal timing diagram according to an embodiment of the disclosure. In the embodiment, during a setting period between a time point t1 and a time point t2, the (n−1)th control signal SN(n−1) has a positive pulse wave. The pull-up transistor TP1 may be conducted according to the positive pulse wave of the (n−1)th control signal SN(n−1), and pulls up the voltage value at the operating node NDP to the first voltage value using the positive pulse wave of the (n−1)th control signal SN(n−1). Therefore, the control transistor TC and the output transistor TO are conducted. In addition, the setting transistor TS3 is also conducted. Therefore, the voltage value at the control node NDX is pulled down to the low voltage value. During the setting period, the first clock signal CK1 has a low voltage value. Therefore, the n-th control signal SN(n) has a low voltage value. The gate driving signal G(n) also has a low voltage value.

During a boost period between the time point t2 and a time point t3, the (n−1)th control signal SN(n−1) has a low voltage value. The pull-up transistor TP1 is disconnected, so that the operating node NDP is floating. The control transistor TC and the output transistor TO are still conducted. The first clock signal CK1 has a positive pulse wave. The second terminal of the output transistor TO has a high voltage value. Therefore, based on the capacitive coupling of the coupling capacitor CP, the gate driving circuit GD(n) further boosts the voltage value of the operating node NDP to a second voltage value using the high voltage value at the second terminal of the output transistor TO, thereby ensuring that the control transistor TC and the output transistor TO are conducted. During the boost period between the time point t2 and the time point t3, the n-th control signal SN(n) has a positive pulse wave. The gate driving signal G(n) also has a positive pulse wave.

During a reset period between the time point t3 and a time point t4, the first clock signal CK1 has a low voltage value. Therefore, the n-th control signal SN(n) has a low voltage value. The gate driving signal G(n) also has a low voltage value. During the reset period, the (n+1)th control signal SN(n+1) has a positive pulse wave. Therefore, the pull-down transistor TP2 is conducted to pull down the voltage value at the operating node NDP to a low voltage value. The control transistor TC, the output transistor TO, and the setting transistor TS3 are disconnected. During the reset period, the setting transistor TS1 is conducted to pull up the voltage value at the control node NDX to a high voltage value. The transistors TN1 to TN3 are conducted according to the high voltage value at the control node NDX. Therefore, the voltage stabilizing circuit 232 pulls down the voltage value at the operating node NDP, the voltage value at the second terminal of the output transistor TO, and the voltage value at the second terminal of the control transistor TC according to the high voltage value at the control node NDX. Therefore, during the reset period, the voltage value at the operating node NDP, the voltage value at the second terminal of the output transistor TO, and the voltage value at the second terminal of the control transistor TC are maintained at the low voltage levels. The noise at the operating node NDP, the noise at the second terminal of the output transistor TO, and the noise at the second terminal of the control transistor TC are suppressed.

During a stable period after the time point t4, the setting transistor TS2 continues to be conducted to maintain the voltage value at the control node NDX at the high voltage value. Therefore, the voltage stabilizing circuit 232 may continue to pull down the voltage value at the operating node NDP, the voltage value at the second terminal of the output transistor TO, and the voltage value at the second terminal of the control transistor TC.

In the embodiment, a width-to-length ratio of a channel of the setting transistor TS2 is less than a width-to-length ratio of a channel of the setting transistor TS3. Therefore, when the setting transistor TS3 is conducted, the setting transistor TS2 does not significantly hinder a decrease in the voltage value at the control node NDX.

Figure 4:
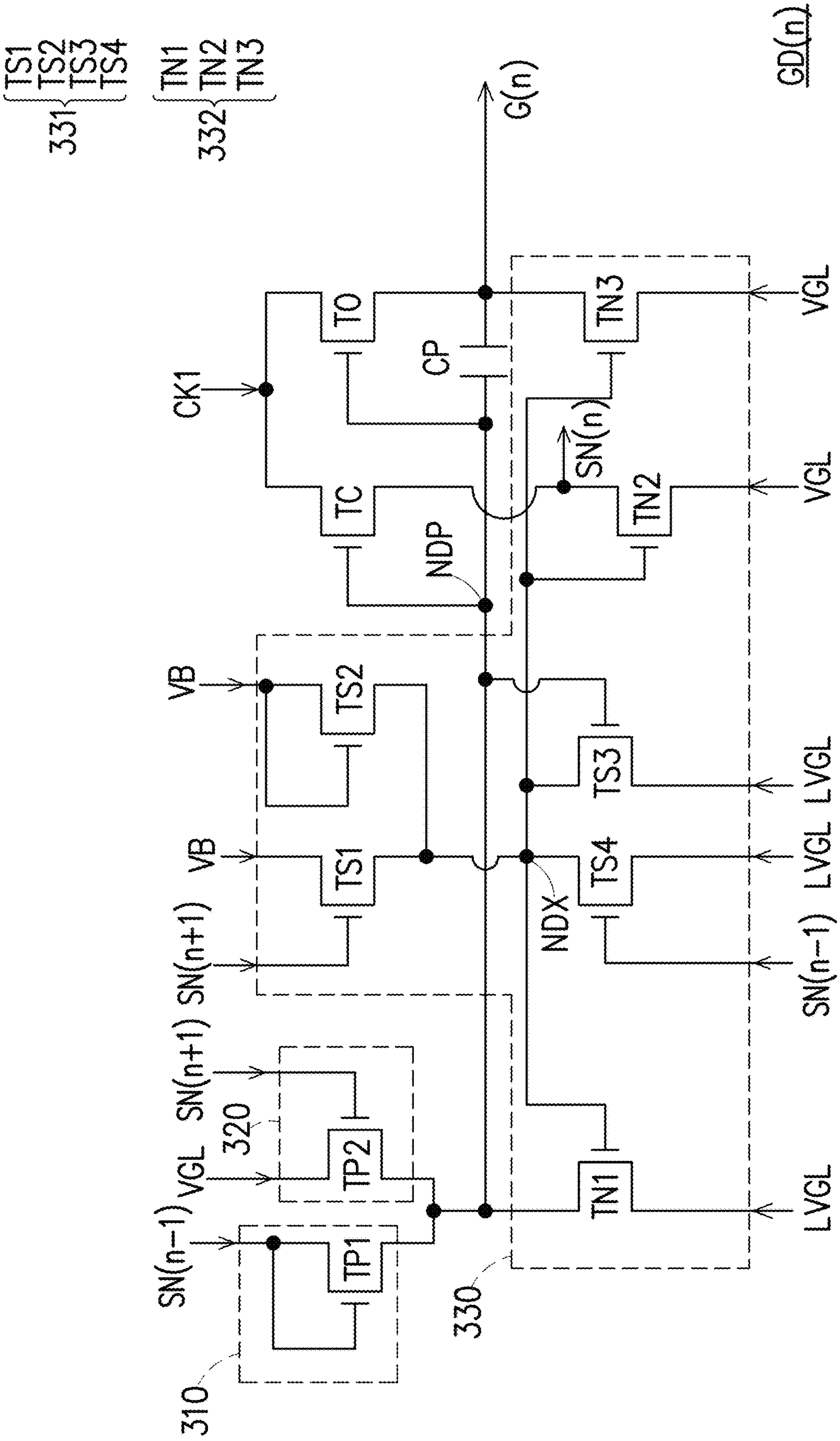
FIG. 4 is a schematic diagram of a gate driving circuit according to an embodiment of the disclosure.

Please refer to FIG. 4. FIG. 4 is a schematic diagram of a gate driving circuit according to an embodiment of the disclosure. In the embodiment, the gate driving circuit GD(n) includes a pull-up circuit 310, a pull-down circuit 320, the output transistor TO, the coupling capacitor CP, the control transistor TC, and a noise suppression circuit 330. Connection manners of the output transistor TO, the coupling capacitor CP, and the control transistor TC have been clearly explained in the embodiment of FIG. 1 and will not be repeated here. Implementations of the pull-up circuit 310 and the pull-down circuit 320 are the same as the implementations of the pull-up circuit 210 and the pull-down circuit 220 shown in FIG. 2, so there will be no repetition here.

In the embodiment, the noise suppression circuit 330 includes a setting circuit 331 and a voltage stabilizing circuit 332. The setting circuit 331 includes setting transistors TS1 to TS4. The voltage stabilizing circuit 332 includes the transistors TN1 to TN3. Connection manners of the setting transistors TS1 to TS3 and the transistors TN1 to TN3 are the same as the connection manners of the setting transistors TS1 to TS3 and the transistors TN1 to TN3 shown in FIG. 2, so there will be no repetition here. In the embodiment, a first terminal of the setting transistor TS4 is connected to the control node NDX. A second terminal of the setting transistor TS4 is connected to the reference low voltage LVGL. A control terminal of the setting transistor TS4 receives the (n−1)th control signal SN(n−1). The setting transistor TS4 may pull down the voltage value at the control node NDX according to the positive pulse wave of the (n−1)th control signal SN(n−1). Therefore, the setting transistor TS4 may speed up the speed of pulling down the voltage value at the control node NDX.

The gate driving circuit GD(n) of the embodiment is also applicable to the timing diagram of FIG. 3.

In the embodiment, the setting transistor TS4 is implemented by an N-type transistor. The setting transistor TS4 may be an N-type TFT (but the disclosure is not limited thereto).

Figure 5:
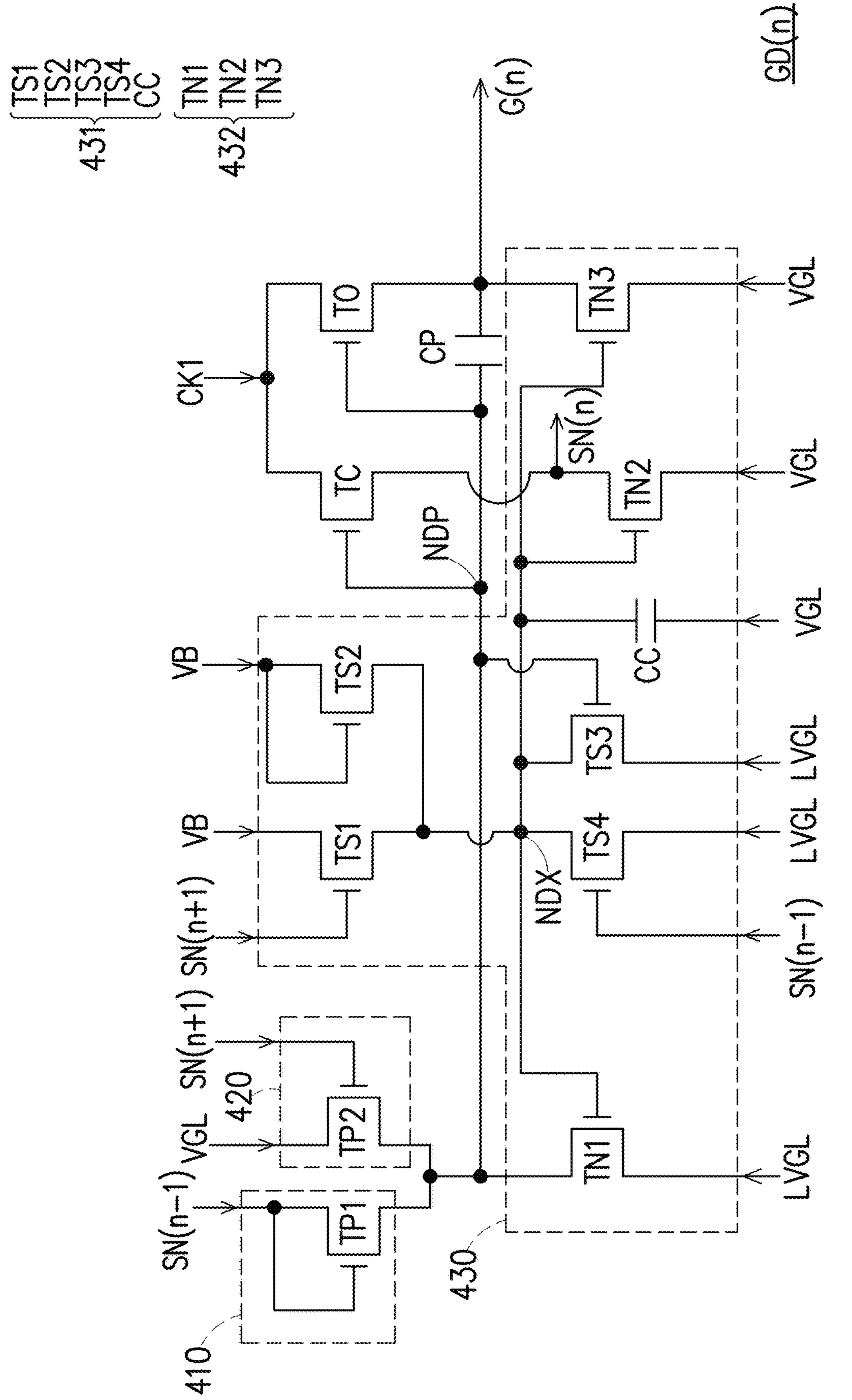
FIG. 5 is a schematic diagram of a gate driving circuit according to an embodiment of the disclosure.

Please refer to FIG. 5. FIG. 5 is a schematic diagram of a gate driving circuit according to an embodiment of the disclosure. In the embodiment, the gate driving circuit GD(n) includes a pull-up circuit 410, a pull-down circuit 420, the output transistor TO, the coupling capacitor CP, the control transistor TC, and a noise suppression circuit 430. Connection manners of the output transistor TO, the coupling capacitor CP, and the control transistor TC have been clearly explained in the embodiment of FIG. 1 and will not be repeated here. Implementations of the pull-up circuit 410 and the pull-down circuit 420 are the same as the implementations of the pull-up circuit 210 and the pull-down circuit 220 shown in FIG. 2, so there will be no repetition here.

The noise suppression circuit 430 includes a setting circuit 431 and a voltage stabilizing circuit 432. The setting circuit 431 includes the setting transistors TS1 to TS4 and a voltage stabilizing capacitor CC. The voltage stabilizing circuit 432 includes the transistors TN1 to TN3. Connection manners of the setting transistor TS1 to TS4 are the same as the connection manners of the setting transistors TS1 to TS4 shown in FIG. 4, so there will be no repetition here. Connection manners of the transistors TN1 to TN3 are the same as the connection manners of the transistors TN1 to TN3 shown in FIG. 2, so there will be no repetition here.

In the embodiment, the voltage stabilizing capacitor CC is connected between the control node NDX and the reference low voltage VGL. The voltage stabilizing capacitor CC is used to extend the length of time the high voltage value at the control node NDX is maintained. In the embodiment, the voltage stabilizing capacitor CC is connected between the control node NDX and the reference low voltage LVGL.

The gate driving circuit GD(n) of the embodiment is also applicable to the timing diagram of FIG. 3.

In some embodiments, the setting transistor TS4 may be omitted.

Figure 6:
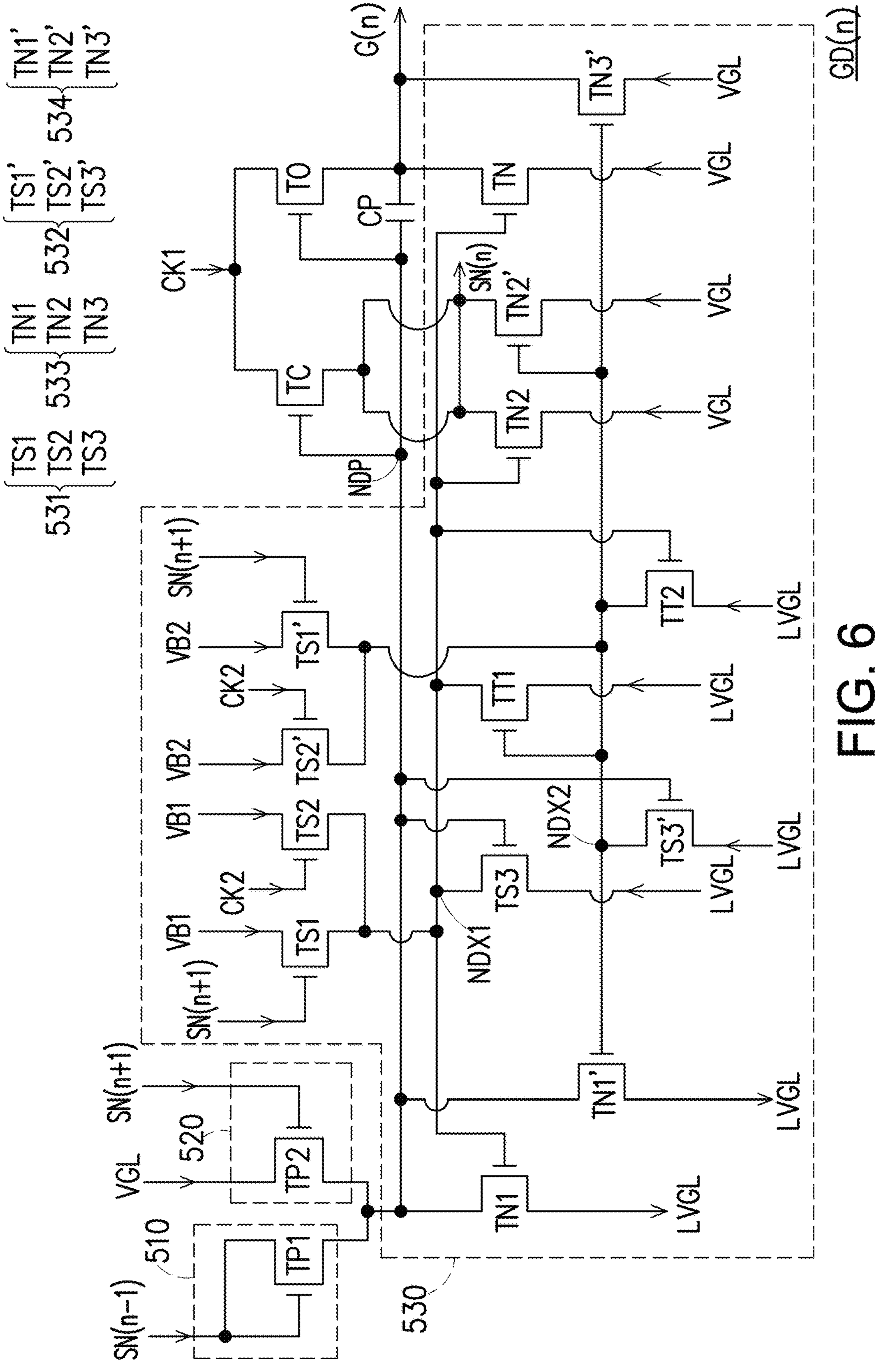
FIG. 6 is a schematic diagram of a gate driving circuit according to an embodiment of the disclosure.

Please refer to FIG. 6. FIG. 6 is a schematic diagram of a gate driving circuit according to an embodiment of the disclosure. In the embodiment, the gate driving circuit GD(n) includes a pull-up circuit 510, a pull-down circuit 520, the output transistor TO, the coupling capacitor CP, the control transistor TC, and a noise suppression circuit 530. Connection manners of the output transistor TO, the coupling capacitor CP, and the control transistor TC have been clearly explained in the embodiment of FIG. 1 and will not be repeated here. Implementations of the pull-up circuit 510 and the pull-down circuit 520 are the same as the implementations of the pull-up circuit 210 and the pull-down circuit 220 shown in FIG. 2, so there will be no repetition here.

In the embodiment, the noise suppression circuit 530 includes setting circuits 531 and 532 and voltage stabilizing circuits 533 and 534. The setting circuit 531 is connected to a control node NDX1. The setting circuit 531 pulls up a voltage value at the control node NDX1 to a high voltage value according to the (n+1)th control signal SN(n+1) and a bias signal VB1. The setting circuit 532 is connected to a control node NDX2. The setting circuit 532 pulls up a voltage value at the control node NDX2 to a high voltage value according to the (n+1)th control signal SN(n+1) and a bias signal VB2.

In the embodiment, the bias signals VB1 and VB2 are complementary to each other. Specifically, if the bias signal VB1 has a high voltage value, the bias signal VB2 has a low voltage value. If the bias signal VB1 has a low voltage value, the bias signal VB2 has a high voltage value. For example, the voltage values of the bias signals VB1 and VB2 are respectively inverted after at least one frame.

The voltage stabilizing circuit 533 is connected to the control node NDX1, the operating node NDP, the second terminal of the output transistor TO, and the second terminal of the control transistor TC. The voltage stabilizing circuit 533 suppresses the noise at the operating node NDP, the noise at the second terminal of the output transistor TO, and the noise at the second terminal of the control transistor TC in response to the high voltage value at the control node NDX1. The voltage stabilizing circuit 534 is connected to the control node NDX2, the operating node NDP, the second terminal of the output transistor TO, and the second terminal of the control transistor TC. The voltage stabilizing circuit 534 suppresses the noise at the operating node NDP, the noise at the second terminal of the output transistor TO, and the noise at the second terminal of the control transistor TC in response to the high voltage value at the control node NDX2.

In the embodiment, the noise suppression circuit 530 switches the voltage value of the control node NDX2 to a low voltage value according to the high voltage value at the control node NDX1 and switches the voltage value of the control node NDX1 to a low voltage value according to the high voltage value at the control node NDX2. Therefore, the voltage stabilizing circuits 533 and 534 may take turns to rest. In this way, the service lives of the voltage stabilizing circuits 533 and 534 may be extended.

In the embodiment, the setting circuit 531 includes the setting transistors TS1 to TS3. The first terminal of the setting transistor TS1 receives the bias signal VB1. The second terminal of the setting transistor TS1 is connected to the control node NDX1. The control terminal of the setting transistor TS1 receives the (n+1)th control signal SN(n+1). The first terminal of the setting transistor TS2 receives the bias signal VB1. The second terminal of the setting transistor TS2 is connected to the control node NDX1. The control terminal of the setting transistor TS2 receives a second clock signal CK2. The first terminal of the setting transistor TS3 is connected to the control node NDX1. The second terminal of the setting transistor TS3 is connected to the reference low voltage LVGL. The control terminal of the setting transistor TS3 is connected to the operating node NDP.

The setting circuit 532 includes setting transistors TS1' to TS3'. A first terminal of the setting transistor TS1' receives the bias signal VB2. A second terminal of the setting transistor TS1' is connected to the control node NDX2. A control terminal of the setting transistor TS1' receives the (n+1)th control signal SN(n+1). A first terminal of the setting transistor TS2' receives the bias signal VB2. A second terminal of the setting transistor TS2' is connected to the control node NDX2. A control terminal of the setting transistor TS2' receives the second clock signal CK2. A first terminal of the setting transistor TS3' is connected to the control node NDX2. A second terminal of the setting transistor TS3' is connected to the reference low voltage LVGL. A control terminal of the setting transistor TS3' is connected to the operating node NDP.

The voltage stabilizing circuit 533 includes the transistors TN1 to TN3. The first terminal of the transistor TN1 is connected to the operating node NDP. The second terminal of the transistor TN1 is connected to the reference low voltage LVGL. The control terminal of the transistor TN1 is connected to the control node NDX1. The first terminal of the transistor TN2 is connected to the second terminal of the control transistor TC. The second terminal of the transistor TN2 is connected to the reference low voltage VGL. The control terminal of the transistor TN2 is connected to the control node NDX1. The first terminal of the transistor TN3 is connected to the second terminal of the output transistor TO. The second terminal of the transistor TN3 is connected to the reference low voltage VGL. The control terminal of the transistor TN3 is connected to the control node NDX1.

The voltage stabilizing circuit 534 includes transistors TN1' to TN3'. A first terminal of the transistor TN1' is connected to the operating node NDP. A second terminal of the transistor TN1' is connected to the reference low voltage LVGL. A control terminal of the transistor TN1' is connected to the control node NDX2. A first terminal of the transistor TN2' is connected to the second terminal of the control transistor TC. A second terminal of the transistor TN2' is connected to the reference low voltage VGL. A control terminal of the transistor TN2' is connected to the control node NDX2. A first terminal of the transistor TN3' is connected to the second terminal of the output transistor TO. A second terminal of the transistor TN3' is connected to the reference low voltage VGL. A control terminal of the transistor TN3' is connected to the control node NDX2.

In the embodiment, the noise suppression circuit 530 also includes switch transistors TT1 and TT2. A first terminal of the switch transistor TT1 is connected to the control node NDX1. A second terminal of the switch transistor TT1 is connected to the reference low voltage LVGL. A control terminal of the switch transistor TT1 is connected to the control node NDX2. A first terminal of the switch transistor TT2 is connected to the control node NDX2. A second terminal of the switch transistor TT2 is connected to the reference low voltage LVGL. A control terminal of the switch transistor TT2 is connected to the control node NDX1.

In the embodiment, the switch transistors TT1 and TT2, the setting transistors TS1 to TS3 and TS1' to TS3', and the transistors TN1 to TN3 and TN1' to TN3' are respectively implemented by N-type transistors. The switch transistors TT1 and TT2, the setting transistors TS1 to TS3 and TS1' to TS3', and the transistors TN1 to TN3 and TN1' to TN3' may respectively be N-type TFTs (but the disclosure is not limited thereto).

Figure 7B:
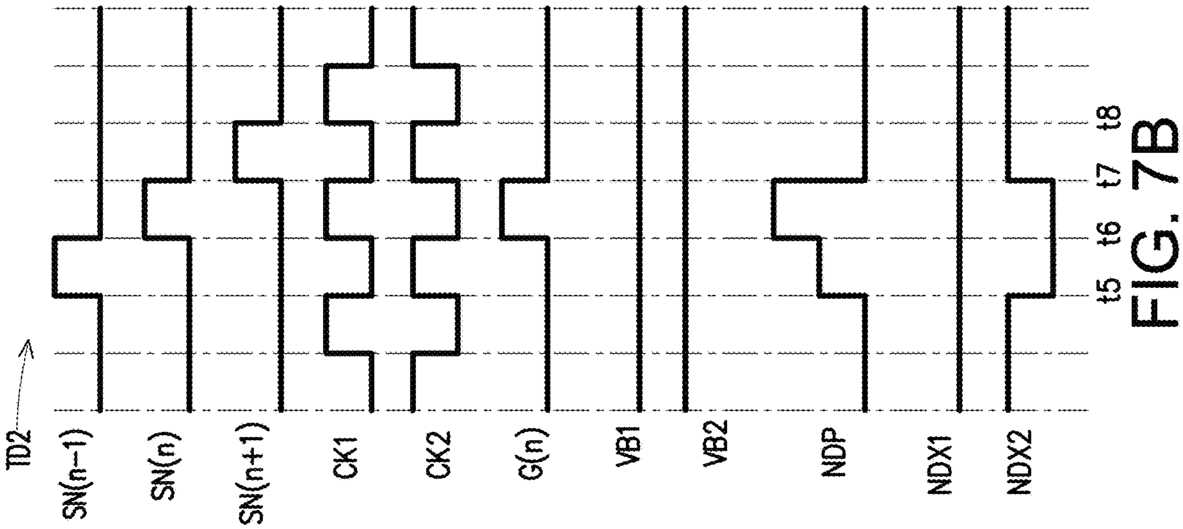
FIG. 7A and FIG. 7B are respectively signal timing diagrams according to an embodiment of the disclosure.
Figure 7A:
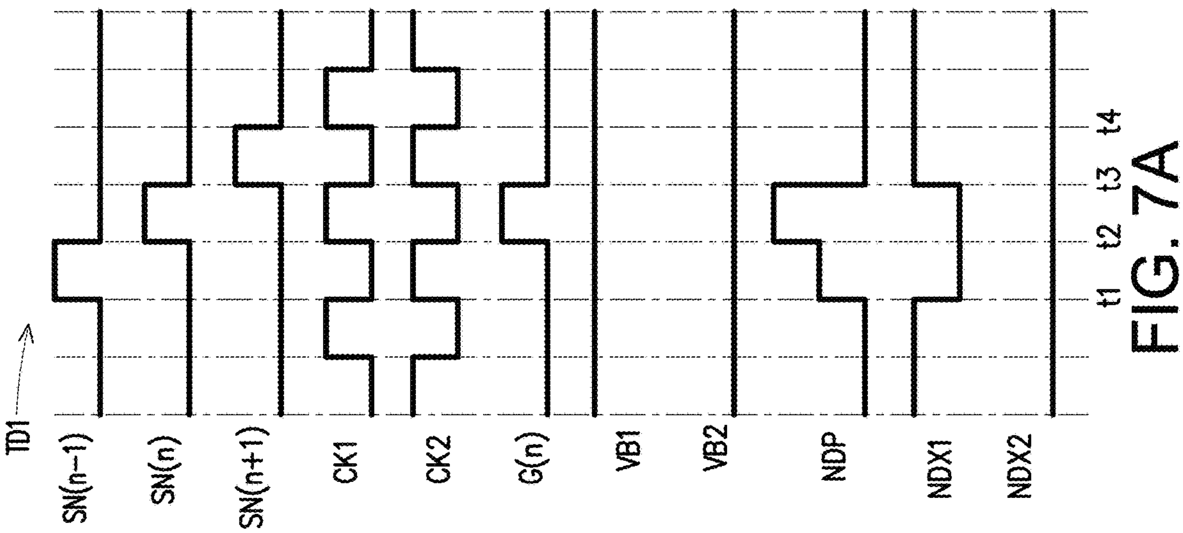

Please refer to FIG. 6, FIG. 7A, and FIG. 7B. FIG. 7A and FIG. 7B are respectively signal timing diagrams according to an embodiment of the disclosure. In the embodiment, FIG. 7A shows the signal timing diagram during a first period TD1. FIG. 7B shows the signal timing diagram during a second period TD2. The first period TD1 and the second period TD2 alternate with each other. For example, the time length of the first period TD1 is equal to the time length of at least one frame. The time length of the second period TD2 is equal to the time length of at least one frame. Based on design requirements, the time length of the first period TD1 is the same as or different from the time length of the second period TD2. In the embodiment, the voltage values of the bias signals VB1 and VB2 may be inverted based on the first period TD1 and the second period TD2.

During the first period TD1, the bias signal VB1 has a high voltage value. The bias signal VB2 has a low voltage value. During the setting period between the time point t1 and the time point t2, the (n−1)th control signal SN(n−1) has a positive pulse wave. The pull-up transistor TP1 may be conducted according to the positive pulse wave of the (n−1)th control signal SN(n−1), and pulls up the voltage value at the operating node NDP to the first voltage value. Therefore, the control transistor TC and the output transistor TO are conducted. In addition, the setting transistors TS3 and TS3' are also conducted. Therefore, the voltage values at the control nodes NDX1 and NDX2 are pulled down to low voltage values. During the setting period, the first clock signal CK1 has a low voltage value. Therefore, the n-th control signal SN(n) has a low voltage value. The gate driving signal G(n) also has a low voltage value.

During the boost period between the time point t2 and the time point t3, the (n−1)th control signal SN(n−1) has a low voltage value. The pull-up transistor TP1 is disconnected, so that the operating node NDP is floating. The control transistor TC and the output transistor TO are still conducted. The first clock signal CK1 has a positive pulse wave. The second terminal of the output transistor TO has a high voltage value. Therefore, based on the capacitive coupling of the coupling capacitor CP, the gate driving circuit GD(n) further boosts the voltage value of the operating node NDP to the second voltage value using the high voltage value at the second terminal of the output transistor TO, thereby ensuring that the control transistor TC and the output transistor TO are conducted. During the boost period, the n-th control signal SN(n) has a positive pulse wave. The gate driving signal G(n) also has a positive pulse wave.

During the reset period between the time point t3 and the time point t4, the first clock signal CK1 has a low voltage value. Therefore, the n-th control signal SN(n) has a low voltage value. The gate driving signal G(n) also has a low voltage value. During the reset period, the (n+1)th control signal SN(n+1) has a positive pulse wave. Therefore, the pull-down transistor TP2 is conducted to pull down the voltage value at the operating node NDP to a low voltage value. The control transistor TC, the output transistor TO, and the setting transistors TS3 and TS3' are disconnected. During the reset period, the second clock signal CK2 has a positive pulse wave. Therefore, the setting transistors TS1 and TS2 are conducted to pull up the voltage value at the control node NDX1 to a high voltage value. The transistors TN1 to TN3 and the switch transistor TT2 are conducted according to the high voltage value at the control node NDX1. Therefore, the noise at the operating node NDP, the noise at the second terminal of the output transistor TO, and the noise at the second terminal of the control transistor TC are suppressed.

During the reset period between the time point t3 and the time point t4, the setting transistors TS1' and TS2' are conducted to pull down the voltage value at the control node NDX2 to a low voltage value. The transistors TN1' to TN3' are disconnected according to the low voltage value at the control node NDX2. Therefore, the transistors TN1' to TN3' rest. In addition, the switch transistor TT2 is disconnected according to the low voltage value at the control node NDX2. The switch transistor TT2 also pulls down the voltage value at the control node NDX2 according to the high voltage value at the control node NDX1, thereby ensuring that the voltage value at the control node NDX2 is maintained at the low voltage value.

After the time point t4, the setting transistor TS2 may maintain the voltage value at the control node NDX1 at the high voltage value in response to the positive pulse wave of the second clock signal CK2.

During the second period TD2, the bias signal VB2 has a high voltage value. The bias signal VB1 has a low voltage value. During a setting period between a time point t5 and a time point t6, the (n−1)th control signal SN(n−1) has a positive pulse wave. The pull-up transistor TP1 may be conducted according to the positive pulse wave of the (n−1)th control signal SN(n−1), and pulls up the voltage value at the operating node NDP to the first voltage value. Therefore, the control transistor TC and the output transistor TO are conducted. In addition, the setting transistors TS3 and TS3' are also conducted. Therefore, the voltage values at the control nodes NDX1 and NDX2 are pulled down to low voltage values. During the setting period, the first clock signal CK1 has a low voltage value. Therefore, the n-th control signal SN(n) has a low voltage value. The gate driving signal G(n) also has a low voltage value.

During a boost period between a time point t6 and a time point t7, the (n−1)th control signal SN(n−1) has a low voltage value. The pull-up transistor TP1 is disconnected, so that the operating node NDP is floating. The control transistor TC and the output transistor TO are still conducted. The first clock signal CK1 has a positive pulse wave. The second terminal of the output transistor TO has a high voltage value. Therefore, based on the capacitive coupling of the coupling capacitor CP, the gate driving circuit GD(n) further boosts the voltage value of the operating node NDP to the second voltage value using the high voltage value at the second terminal of the output transistor TO, thereby ensuring that the control transistor TC and the output transistor TO are conducted. During the boost period, the n-th control signal SN(n) has a positive pulse wave. The gate driving signal G(n) also has a positive pulse wave.

During a reset period between a time point t7 and a time point t8, the first clock signal CK1 has a low voltage value. Therefore, the n-th control signal SN(n) has a low voltage value. The gate driving signal G(n) also has a low voltage value. During the reset period, the (n+1)th control signal SN(n+1) has a positive pulse wave. Therefore, the pull-down transistor TP2 is conducted to pull down the voltage value at the operating node NDP to a low voltage value. The control transistor TC, the output transistor TO, and the setting transistors TS3 and TS3' are disconnected. During the reset period, the second clock signal CK2 has a positive pulse wave. Therefore, the setting transistors TS1' and TS2' are conducted to pull up the voltage value at the control node NDX2 to a high voltage value. The transistors TN1' to TN3' and the switch transistor TT1 are conducted according to the high voltage value at the control node NDX2. Therefore, the noise at the operating node NDP, the noise at the second terminal of the output transistor TO, and the noise at the second terminal of the control transistor TC are suppressed.

During the reset period between the time point t7 and the time point t8, the setting transistors TS1 and TS2 are conducted to pull down the voltage value at the control node NDX1 to a low voltage value. The transistors TN1 to TN3 are disconnected according to the low voltage value at the control node NDX2. Therefore, the transistors TN1 to TN3 rest. In addition, the switch transistor TT2 is disconnected according to the low voltage value at the control node NDX2. The switch transistor TT1 also pulls down the voltage value at the control node NDX1 according to the high voltage value at the control node NDX2, thereby ensuring that the voltage value at the control node NDX1 is maintained at the low voltage value.

After the time point t8, the setting transistor TS2' may maintain the voltage value at the control node NDX2 at the high voltage value in response to the positive pulse wave of the second clock signal CK2.

In some embodiments, the voltage stabilizing capacitor CC shown in FIG. 4 may be disposed between the control node NDX1 and the reference low voltage VGL. In some embodiments, the voltage stabilizing capacitor CC shown in FIG. 4 may be disposed between the control node NDX2 and the reference low voltage VGL.

In summary, the gate driving circuit may control other gate driving circuits using the n-th control signal. The n-th control signal is not interfered by the pixel circuit. In addition, the noise suppression circuit suppresses the noise at the operating node, the noise at the second terminal of the output transistor, and the noise at the second terminal of the control transistor. The noise suppression circuit isolates the interference at the operating node, the second terminal of the output transistor, and the second terminal of the control transistor. Therefore, the risk of noise occurring in the n-th control signal and the gate driving signal may be reduced. In this way, the gate driving circuit has high stability. In addition, in the case where the n-th control signal does not generate noise, the risk of short circuit caused by abnormality in other gate driving circuits may be reduced. Therefore, the life of the gate driving device may be increased.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A gate driving circuit, comprising:

a pull-up circuit, connected to an operating node and configured to pull up a voltage value at the operating node according to an (n−1)th control signal;

a pull-down circuit, connected to the operating node and configured to pull down the voltage value at the operating node according to an (n+1)th control signal;

an output transistor, wherein a first terminal of the output transistor receives a first clock signal, a second terminal of the output transistor outputs a gate driving signal, and a control terminal of the output transistor is connected to the operating node;

a coupling capacitor, connected between the second terminal of the output transistor and the control terminal of the output transistor;

a control transistor, wherein a first terminal of the control transistor receives the first clock signal, a second terminal of the control transistor outputs an n-th control signal, and a control terminal of the control transistor is connected to the operating node; and a noise suppression circuit, connected to the operating node, the second terminal of the output transistor, and the second terminal of the control transistor and configured to suppress noise at the operating node, noise at the second terminal of the output transistor, and noise at the second terminal of the control transistor according to the (n+1)th control signal.

2. The gate driving circuit according to claim 1, wherein the noise suppression circuit comprises:

a setting circuit, connected to a control node and configured to pull up a voltage value at the control node to a high voltage value according to the (n+1)th control signal; and a voltage stabilizing circuit, connected to the control node, the operating node, the second terminal of the output transistor, and the second terminal of the control transistor and configured to suppress noise at the operating node, noise at the second terminal of the output transistor, and the noise at the second terminal of the control transistor in response to the high voltage value at the control node.

3. The gate driving circuit according to claim 2, wherein the setting circuit comprises:

a first setting transistor, wherein a first terminal of the first setting transistor receives a bias signal, a second terminal of the first setting transistor is connected to the control node, and a control terminal of the first setting transistor receives the (n+1)th control signal;

a second setting transistor, wherein a first terminal of the second setting transistor receives the bias signal, a second terminal of the second setting transistor is connected to the control node, and a control terminal of the second setting transistor receives one of the bias signal and a second clock signal; and a third setting transistor, wherein a first terminal of the third setting transistor is connected to the control node, a second terminal of the third setting transistor is connected to a first reference low voltage, and a control terminal of the third setting transistor is connected to the operating node.

4. The gate driving circuit according to claim 3, wherein the setting circuit further comprises:

a fourth setting transistor, wherein a first terminal of the fourth setting transistor is connected to the control node, a second terminal of the fourth setting transistor is connected to the first reference low voltage, and a control terminal of the fourth setting transistor receives the (n−1)th control signal.

5. The gate driving circuit according to claim 3, wherein the setting circuit further comprises:

a voltage stabilizing capacitor, connected between the control node and a second reference low voltage.

6. The gate driving circuit according to claim 2, wherein the voltage stabilizing circuit comprises:

a first transistor, wherein a first terminal of the first transistor is connected to the operating node, a second terminal of the first transistor is connected to a first reference low voltage, and a control terminal of the first transistor is connected to the control node;

a second transistor, wherein a first terminal of the second transistor is connected to the second terminal of the control transistor, a second terminal of the second transistor is connected to a second reference low voltage, and a control terminal of the second transistor is connected to the control node; and a third transistor, wherein a first terminal of the third transistor is connected to the second terminal of the output transistor, a second terminal of the third transistor is connected to the second reference low voltage, and a control terminal of the third transistor is connected to the control node.

7. The gate driving circuit according to claim 6, wherein the first transistor, the second transistor, and the third transistor are conducted according to the high voltage value at the control node and are disconnected according to a low voltage value at the control node.

8. The gate driving circuit according to claim 1, wherein the noise suppression circuit comprises:

a first setting circuit, connected to a first control node and configured to pull up a voltage value at the first control node to a high voltage value according to the (n+1)th control signal and a first bias signal;

a second setting circuit, connected to a second control node and configured to pull up a voltage value at the second control node to a high voltage value according to the (n+1)th control signal and a second bias signal, wherein the first bias signal and the second bias signal are complementary to each other;

a first voltage stabilizing circuit, connected to the first control node, the operating node, the second terminal of the output transistor, and the second terminal of the control transistor and configured to suppress noise at the operating node, noise at the second terminal of the output transistor, and noise at the second terminal of the control transistor in response to the high voltage value at the first control node; and a second voltage stabilizing circuit, connected to the second control node, the operating node, the second terminal of the output transistor, and the second terminal of the control transistor and configured to suppress noise at the operating node, noise at the second terminal of the output transistor, and noise at the second terminal of the control transistor in response to the high voltage value at the second control node.

9. The gate driving circuit according to claim 8, wherein the first setting circuit comprises:

a first setting transistor, wherein a first terminal of the first setting transistor receives the first bias signal, a second terminal of the first setting transistor is connected to the first control node, and a control terminal of the first setting transistor receives the (n+1)th control signal;

a second setting transistor, wherein a first terminal of the second setting transistor receives the first bias signal, a second terminal of the second setting transistor is connected to the first control node, and a control terminal of the second setting transistor receives a second clock signal; and a third setting transistor, wherein a first terminal of the third setting transistor is connected to the first control node, a second terminal of the third setting transistor is connected to a first reference low voltage, and a control terminal of the third setting transistor is connected to the operating node.

10. The gate driving circuit according to claim 9, wherein the second setting circuit comprises:

a fourth setting transistor, wherein a first terminal of the fourth setting transistor receives a second bias signal, a second terminal of the fourth setting transistor is connected to the second control node, and a control terminal of the fourth setting transistor receives the (n+1)th control signal;

a fifth setting transistor, wherein a first terminal of the fifth setting transistor receives the second bias signal, a second terminal of the fifth setting transistor is connected to the second control node, and a control terminal of the fifth setting transistor receives the second clock signal; and a sixth setting transistor, wherein a first terminal of the sixth setting transistor is connected to the second control node, a second terminal of the sixth setting transistor is connected to the first reference low voltage, and a control terminal of the sixth setting transistor is connected to the operating node.

11. The gate driving circuit according to claim 8, wherein the first voltage stabilizing circuit comprises:

a first transistor, wherein a first terminal of the first transistor is connected to the operating node, a second terminal of the first transistor is connected to a first reference low voltage, and a control terminal of the first transistor is connected to the first control node;

a second transistor, wherein a first terminal of the second transistor is connected to the second terminal of the control transistor, a second terminal of the second transistor is connected to a second reference low voltage, and a control terminal of the second transistor is connected to the first control node; and a third transistor, wherein a first terminal of the third transistor is connected to the second terminal of the output transistor, a second terminal of the third transistor is connected to the second reference low voltage, and a control terminal of the third transistor is connected to the first control node.

12. The gate driving circuit according to claim 11, wherein the second voltage stabilizing circuit comprises:

a fourth transistor, wherein a first terminal of the fourth transistor is connected to the operating node, a second terminal of the fourth transistor is connected to the first reference low voltage, and a control terminal of the fourth transistor is connected to the second control node;

a fifth transistor, wherein a first terminal of the fifth transistor is connected to the second terminal of the control transistor, a second terminal of the fifth transistor is connected to the second reference low voltage, and a control terminal of the fifth transistor is connected to the second control node; and a sixth transistor, wherein a first terminal of the sixth transistor is connected to the second terminal of the output transistor, a second terminal of the sixth transistor is connected to the second reference low voltage, and a control terminal of the sixth transistor is connected to the second control node.

13. The gate driving circuit according to claim 8, wherein the noise suppression circuit switches the voltage value of the second control node to a low voltage value according to the high voltage value at the first control node and switches the voltage value of the first control node to a low voltage value according to the high voltage value at the second control node.

14. The gate driving circuit according to claim 8, wherein the noise suppression circuit further comprises:

a first switch transistor, wherein a first terminal of the first switch transistor is connected to the first control node, a second terminal of the first switch transistor is connected to a first reference low voltage, and a control terminal of the first switch transistor is connected to the second control node; and a second switch transistor, wherein a first terminal of the second switch transistor is connected to the second control node, a second terminal of the second switch transistor is connected to the first reference low voltage, and a control terminal of the second switch transistor is connected to the first control node.

15. The gate driving circuit according to claim 1, wherein the pull-up circuit comprises:

a pull-up transistor, wherein a first terminal of the pull-up transistor and a control terminal of the pull-up transistor receive the (n−1)th control signal, and a second terminal of the pull-up transistor is connected to the operating node.

16. The gate driving circuit according to claim 1, wherein the pull-down circuit comprises:

a pull-down transistor, wherein a first terminal of the pull-down transistor receives a reference low voltage, a second terminal of the pull-down transistor is connected to the operating node, and a control terminal of the pull-down transistor receives the (n+1)th control signal.

* * * * *